US012092383B2

(12) United States Patent
Kikuchi

(10) Patent No.: US 12,092,383 B2
(45) Date of Patent: Sep. 17, 2024

(54) REFRIGERATION CYCLE DEVICE

(71) Applicant: Mitsubishi Electric Corporation, Tokyo (JP)

(72) Inventor: Hiromitsu Kikuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 898 days.

(21) Appl. No.: 17/265,300

(22) PCT Filed: Oct. 3, 2018

(86) PCT No.: PCT/JP2018/037030
§ 371 (c)(1),
(2) Date: Feb. 2, 2021

(87) PCT Pub. No.: WO2020/070828
PCT Pub. Date: Apr. 9, 2020

(65) Prior Publication Data
US 2021/0318046 A1   Oct. 14, 2021

(51) Int. Cl.
*F25B 49/02* (2006.01)
*F25B 13/00* (2006.01)

(52) U.S. Cl.
CPC .............. *F25B 49/02* (2013.01); *F25B 13/00* (2013.01)

(58) Field of Classification Search
CPC ................................. F25B 49/02; F25B 13/00
USPC .......................................................... 62/160
See application file for complete search history.

(56) References Cited

U.S. PATENT DOCUMENTS

| | | | | |
|---|---|---|---|---|
| 5,605,053 A | * | 2/1997 | Otori ........................ | F24F 11/56 |
| | | | | 62/181 |
| 8,973,387 B2 | * | 3/2015 | Osaka ................ | B60H 1/00021 |
| | | | | 62/238.7 |
| 11,674,706 B2 | * | 6/2023 | Longenecker ........... | F24F 11/86 |
| | | | | 62/160 |

(Continued)

FOREIGN PATENT DOCUMENTS

| | | | |
|---|---|---|---|
| JP | 4389916 B2 | 12/2009 | |
| JP | 2016088151 A | * 5/2016 | |
| JP | 2019013062 A | * 1/2019 | ............ B60L 53/11 |

OTHER PUBLICATIONS

International Search Report of the International Searching Authority mailed Dec. 18, 2018 for the corresponding International application No. PCT/JP2018/037030 (and English translation).

*Primary Examiner* — Raheena R Malik
(74) *Attorney, Agent, or Firm* — Posz Law Group, PLC

(57) ABSTRACT

A refrigeration cycle device includes: a refrigeration cycle circuit including: a compressor and an indoor heat exchanger; an indoor air-sending device including a fan and a motor to supply air to the indoor heat exchanger; and a controller to control the frequency of the compressor and the rotation speed of the motor. The controller controls the rotation speed of the motor by controlling a frequency of an alternating current output from an inverter to the motor. The inverter is disposed at a position exposed to air heat-exchanged in the indoor heat exchanger. The controller controls the frequency of the compressor to a frequency at which a temperature of the inverter becomes lower than a first prescribed temperature in a state where the rotation speed of the motor is lower than a prescribed rotation speed.

7 Claims, 7 Drawing Sheets

(56) References Cited

U.S. PATENT DOCUMENTS

2021/0318046 A1\* 10/2021 Kikuchi .................. F25B 13/00
2022/0412576 A1\* 12/2022 Leezer .................... F24F 13/28

\* cited by examiner

REFRIGERATION CYCLE DEVICE

CROSS REFERENCE TO RELATED APPLICATION

This application is a U.S. national stage application of PCT/JP2018/037030 filed on Oct. 3, 2018, the contents of which are incorporated herein by reference.

TECHNICAL FIELD

The present disclosure relates to a refrigeration cycle device in which an air volume of an indoor air-sending device of an indoor unit can be changed by inverter control.

BACKGROUND ART

As a refrigeration cycle device used as an air-conditioning device, a refrigeration cycle device in which a frequency of a compressor of an outdoor unit can be changed by inverter control has been proposed (for example, see Patent Literature 1). More specifically, a controller of such a refrigeration cycle device includes an inverter that converts a direct current into an alternating current and outputs the alternating current to the compressor. Further, the controller controls the frequency of the compressor by controlling a frequency of the alternating current output from the inverter to the compressor. In the following, the compressor having the frequency that can be changed by the inverter control is referred to as an inverter compressor.

In a case where the frequency is increased to increase a circulation amount of refrigerant in the inverter compressor, when the circulation amount of the refrigerant exceeds an allowable amount of the inverter compressor, namely, when the inverter compressor is overloaded, a heat generation amount of the inverter may be increased and a temperature of the inverter may become greater than or equal to an allowable temperature. Further, the inverter compressor may be abnormally stopped. Therefore, in the refrigeration cycle device disclosed in Patent Literature 1, the frequency of the inverter compressor is lowered before the inverter compressor is overloaded, to avoid abnormal stop of the inverter compressor. To secure the circulation amount of the refrigerant, the refrigeration cycle device disclosed in Patent Literature 1 starts up a compressor of a fixed capacity when the frequency of the inverter compressor is lowered.

CITATION LIST

Patent Literature

Patent Literature 1: Japanese Patent No. 4389916

SUMMARY OF INVENTION

Technical Problem

As the refrigeration cycle device used as the air-conditioning device, a refrigeration cycle device in which an air volume of an indoor air-sending device of an indoor unit can be changed by inverter control has been also proposed. More specifically, the indoor air-sending device of such a refrigeration cycle device includes a fan and a motor that drives the fan and is variable in rotation speed, and supplies air to an indoor heat exchanger by the fan rotated by the motor. Further, a controller of such a refrigeration cycle device includes an inverter that converts a direct current into an alternating current and outputs the alternating current to the motor of the indoor air-sending device. Further, the controller controls the rotation speed of each of the motor and the fan by controlling a frequency of the alternating current output from the inverter to the motor. Controlling the rotation speed of each of the motor and the fan of the indoor air-sending device in the above-described manner makes it possible to adjust the air volume of the indoor air-sending device and static pressure inside an air duct to which the air is blown out from the fan of the indoor air-sending device. In the following, the indoor air-sending device having the rotation speed changeable by inverter control is referred to as an inverter indoor air-sending device.

In the indoor unit including the inverter indoor air-sending device, the inverter is disposed at a position exposed to air heat-exchanged in the indoor heat exchanger. Accordingly, in an operation state where the air volume of the inverter indoor air-sending device is large, a wind velocity of the air blown to the inverter is sufficient to cool the inverter. Therefore, in the operation state where the air volume of the inverter indoor air-sending device is large, a temperature rise degree of the inverter is small. In contrast, in an operation state where the air volume of the inverter indoor air-sending device is small, the wind velocity of the air blown to the inverter is insufficient to cool the inverter. Therefore, in the operation state where the air volume of the inverter indoor air-sending device is small, the temperature rise degree of the inverter is increased. In particular, in an operation state where the static pressure inside the air duct to which the air is blown out from the fan of the indoor air-sending device is high, the air volume of the inverter indoor air-sending device is small, and the rotation speed of the motor of the inverter indoor air-sending device is high. Accordingly, the temperature rise degree of the inverter is further increased.

To meet customer demands for the refrigeration cycle device in future, the air volume range required for the inverter indoor air-sending device is increased, and necessity to further make the air volume lower than a lower limit of the air volume allowed for the known inverter indoor air-sending device arises. Therefore, it is considered that the inverter outputting the alternating current to the inverter indoor air-sending device is further increased in temperature. Accordingly, it is necessary to take measures for avoiding abnormal stop of the inverter indoor air-sending device caused by temperature increase of the inverter.

To avoid the abnormal stop of the inverter indoor air-sending device, the configuration disclosed in Patent Literature 1 may be used. In other words, before the temperature of the inverter becomes greater than or equal to the allowable temperature, the rotation speed of each of the motor and the fan of the inverter indoor air-sending device may be reduced. Controlling the rotation speed of each of the motor and the fan of the inverter indoor air-sending device in the above-described manner makes it possible to reduce a load of the inverter indoor air-sending device. However, when the rotation speed of each of the motor and the fan of the inverter indoor air-sending device is controlled in the above-described manner, the air volume of the inverter indoor air-sending device is reduced. As a result, capacity to cool the inverter is insufficient, the temperature of the inverter becomes greater than or equal to the allowable temperature, and the inverter indoor air-sending device is abnormally stopped. Thus, in the known refrigeration cycle device including the inverter indoor air-sending device, it is difficult to make the air volume range of the inverter indoor air-sending device larger than the current air volume range.

The present disclosure has been made to solve the above-described problems, and an object of the present disclosure is to provide a refrigeration cycle device in which an air volume range of an inverter indoor air-sending device can be made larger than a known air volume range.

Solution to Problem

A refrigeration cycle device according to an embodiment of the present disclosure includes: a refrigeration cycle circuit through which refrigerant circulates, the refrigeration cycle circuit including a compressor variable in frequency and an indoor heat exchanger functioning as a radiator; an indoor air-sending device including a fan and a motor, the motor driving the fan and being variable in rotation speed, the indoor air-sending device being configured to supply air to the indoor heat exchanger by the fan rotated by the motor; and a controller configured to control the frequency of the compressor and the rotation speed of the motor. The controller includes an inverter that converts a direct current into an alternating current and outputs the alternating current to the motor. The controller controls the rotation speed of the motor by controlling a frequency of the alternating current output from the inverter to the motor. The inverter is disposed at a position exposed to air heat-exchanged by the indoor heat exchanger. The controller controls the frequency of the compressor to a frequency at which a temperature of the inverter becomes lower than a first prescribed temperature in a state where the rotation speed of the motor is lower than a prescribed rotation speed.

Advantageous Effects of Invention

The controller of the refrigeration cycle device according to the embodiment of the present disclosure controls the frequency of the compressor to the frequency at which the temperature of the inverter becomes lower than the first prescribed temperature in the state where the rotation speed of the motor of the indoor air-sending device is lower than the prescribed rotation speed. In other words, the refrigeration cycle device according to the embodiment of the present disclosure controls the condensing temperature that is the temperature of the refrigerant flowing through the indoor heat exchanger, namely, controls the temperature of the air cooling the inverter. Even in the case where the rotation speed of the motor of the indoor air-sending device becomes lower than the prescribed rotation speed, the refrigeration cycle device maintains the temperature of the inverter at the temperature lower than the first prescribed temperature. Therefore, in the refrigeration cycle device according to the embodiment of the present disclosure, the air volume range of the indoor air-sending device can be made larger than the known air volume range. In other words, even in an operation state where the indoor air-sending device is abnormally stopped with the known technology, the refrigeration cycle device according to the embodiment of the present disclosure can perform continuous operation.

DESCRIPTION OF EMBODIMENTS

Embodiment 1

A configuration and operation of a refrigeration cycle device according to Embodiment 1 are described below.

Figure 1:
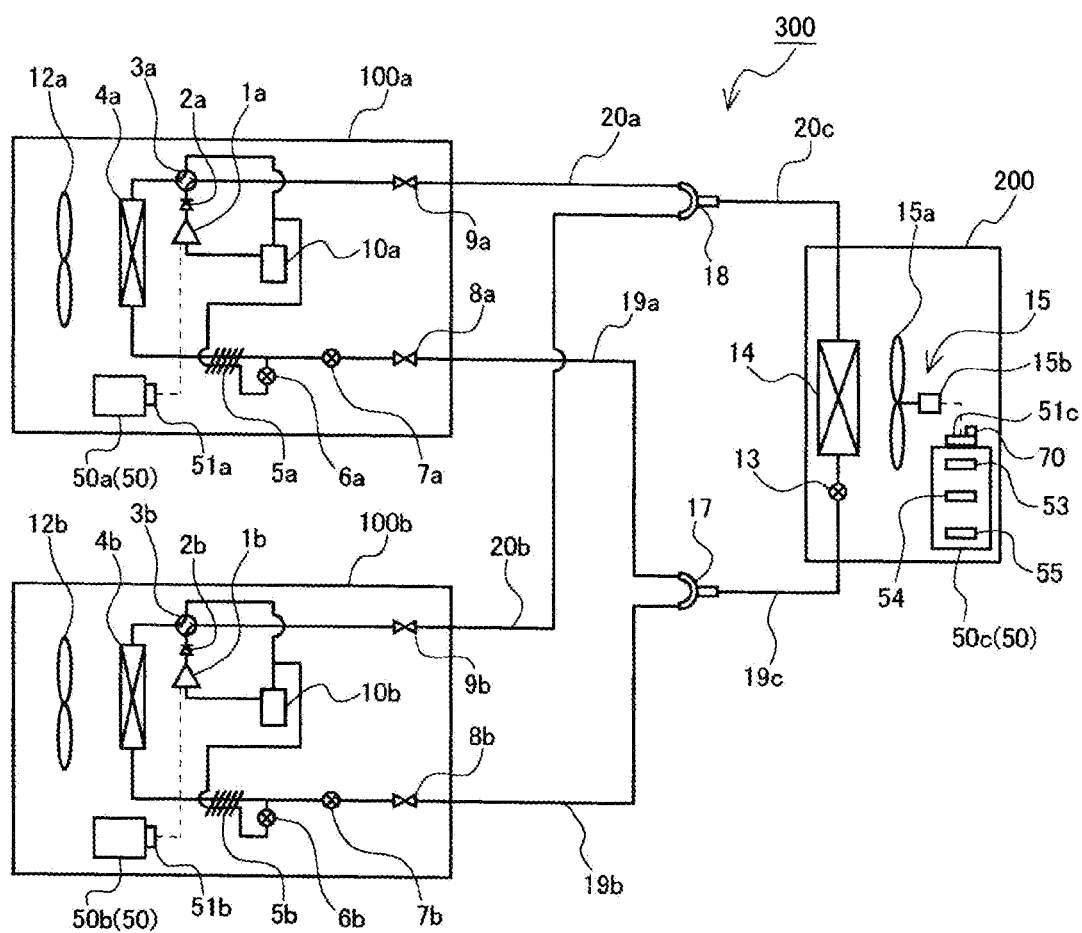
FIG. 1 is a diagram illustrating an entire configuration of a refrigeration cycle device according to Embodiment 1 of the present disclosure.

FIG. 1 is a diagram illustrating an entire configuration of the refrigeration cycle device according to Embodiment 1 of the present disclosure.

As illustrated in FIG. 1, a refrigeration cycle device 300 according to Embodiment 1 includes an outdoor unit 100a and an outdoor unit 100b that are heat source-side units, and an indoor unit 200 that is a use-side unit. The number of outdoor units is not limited to two. One or three or more outdoor units may be provided. Further, the number of indoor units is also not limited to one. Two or more indoor units may be provided.

The refrigeration cycle device 300 further includes a refrigerant pipe that connects the outdoor unit 100a and the outdoor unit 100b to the indoor unit 200 in parallel. The refrigeration cycle device 300 uses the refrigerant pipe to circulate refrigerant between the outdoor unit 100a and the indoor unit 200 and to circulate the refrigerant between the outdoor unit 100b and the indoor unit 200. More specifically, the refrigerant pipe that connects the outdoor unit 100a and the outdoor unit 100b to the indoor unit 200 in parallel includes a liquid pipe 19a, a liquid pipe 19b, a liquid pipe 19c, a gas pipe 20a, a gas pipe 20b, and a gas pipe 20c. The refrigeration cycle device 300 further includes a liquid distributor 17 that couples the liquid pipe 19a, the liquid pipe 19b, and the liquid pipe 19c to one another. The refrigeration cycle device 300 further includes a gas distributor 18 that couples the gas pipe 20a, the gas pipe 20b, and the gas pipe 20c to one another.

The outdoor unit 100a includes a compressor 1a, a check valve 2a, a four-way valve 3a, an outdoor heat exchanger 4a, an outdoor air-sending device 12a, a subcooling heat exchanger 5a, an expansion valve 6a, an expansion valve 7a, a liquid operation valve 8a, a gas operation valve 9a, and an accumulator 10a.

The outdoor unit 100b includes a compressor 1b, a check valve 2b, a four-way valve 3b, an outdoor heat exchanger 4b, an outdoor air-sending device 12b, a subcooling heat exchanger 5b, an expansion valve 6b, an expansion valve 7b, a liquid operation valve 8b, a gas operation valve 9b, and an accumulator 10b.

The indoor unit 200 includes an expansion valve 13, an indoor heat exchanger 14, and an indoor air-sending device 15.

A refrigeration cycle circuit configured between the outdoor unit 100a and the indoor unit 200 is described.

In the outdoor unit 100a and the indoor unit 200, the compressor 1a, the check valve 2a, the four-way valve 3a, the outdoor heat exchanger 4a, the subcooling heat exchanger 5a, the expansion valve 7a, the expansion valve 13, the indoor heat exchanger 14, the four-way valve 3a, and the accumulator 10a are connected by the refrigerant pipe to configure a refrigerant circuit. During cooling operation, as illustrated in FIG. 1, a discharge port of the compressor 1a, the check valve 2a, the four-way valve 3a, the outdoor heat exchanger 4a, the subcooling heat exchanger 5a, the expansion valve 7a, the expansion valve 13, the indoor heat exchanger 14, the four-way valve 3a, the accumulator 10a, and a suction port of the compressor 1a are connected in this order to form the refrigeration cycle circuit through which the refrigerant circulates.

Further, the outdoor unit 100a includes a bypass pipe that connects the refrigerant pipe connecting the subcooling heat exchanger 5a and the expansion valve 7a to the refrigerant pipe connecting the four-way valve 3a and the accumulator 10a. The bypass pipe is branched from the refrigerant pipe connecting the subcooling heat exchanger 5a and the expansion valve 7a, and causes the refrigerant to flow the refrigerant pipe connecting the four-way valve 3a and the accumulator 10a through the expansion valve 6a and the subcooling heat exchanger 5a.

In the above-described refrigerant circuit, the expansion valve 7a and the expansion valve 13 are connected through the liquid operation valve 8a and the liquid distributor 17, and the liquid operation valve 8a and the liquid distributor 17 are connected by the liquid pipe 19a. In addition, the indoor heat exchanger 14 and the four-way valve 3a are connected through the gas distributor 18 and the gas operation valve 9a, and the gas distributor 18 and the gas operation valve 9a are connected by the gas pipe 20a.

During heating operation, the discharge port of the compressor 1a, the check valve 2a, the four-way valve 3a, the indoor heat exchanger 14, the expansion valve 13, the expansion valve 7a, the subcooling heat exchanger 5a, the outdoor heat exchanger 4a, the four-way valve 3a, the accumulator 10a, and the suction port of the compressor 1a are connected in this order to form the refrigeration cycle circuit through which the refrigerant circulates.

Next, a refrigeration cycle circuit configured between the outdoor unit 100b and the indoor unit 200 is described.

In the outdoor unit 100b and the indoor unit 200, the compressor 1b, the check valve 2b, the four-way valve 3b, the outdoor heat exchanger 4b, the subcooling heat exchanger 5b, the expansion valve 7b, the expansion valve 13, the indoor heat exchanger 14, the four-way valve 3b, and the accumulator 10b are connected by the refrigerant pipe to configure the refrigerant circuit. During the cooling operation, a discharge port of the compressor 1b, the check valve 2b, the four-way valve 3b, the outdoor heat exchanger 4b, the subcooling heat exchanger 5b, the expansion valve 7b, the expansion valve 13, the indoor heat exchanger 14, the four-way valve 3b, the accumulator 10b, and a suction port of the compressor 1b are connected in this order to form the refrigeration cycle circuit through which the refrigerant circulates.

Further, the outdoor unit 100b includes a bypass pipe that connects the refrigerant pipe connecting the subcooling heat exchanger 5b and the expansion valve 7b to the refrigerant pipe connecting the four-way valve 3b and the accumulator 10b. The bypass pipe is branched from the refrigerant pipe connecting the subcooling heat exchanger 5b and the expansion valve 7b, and causes the refrigerant to flow the refrigerant pipe connecting the four-way valve 3b and the accumulator 10b through the expansion valve 6b and the subcooling heat exchanger 5b.

In the above-described refrigerant circuit, the expansion valve 7b and the expansion valve 13 are connected through the liquid operation valve 8b and the liquid distributor 17, and the liquid operation valve 8b and the liquid distributor 17 are connected by the liquid pipe 19b. In addition, the indoor heat exchanger 14 and the four-way valve 3b are connected through the gas distributor 18 and the gas operation valve 9b, and the gas distributor 18 and the gas operation valve 9b are connected by the gas pipe 20b.

During the heating operation, the discharge port of the compressor 1b, the check valve 2b, the four-way valve 3b, the indoor heat exchanger 14, the expansion valve 13, the expansion valve 7b, the subcooling heat exchanger 5b, the outdoor heat exchanger 4b, the four-way valve 3b, the accumulator 10b, and the suction port of the compressor 1b are connected in this order to form the refrigeration cycle circuit through which the refrigerant circulates.

Next, a detailed configuration of the outdoor unit 100a is described.

The compressor 1a suctions low-temperature and low-pressure gas refrigerant from the suction port, compresses the low-temperature and low-pressure gas refrigerant into high-temperature and high-pressure refrigerant, and discharges the high-temperature and high-pressure refrigerant from the discharge port toward the four-way valve 3a. The compressor 1a has the frequency changeable by the inverter control. The check valve 2a prevents the refrigerant from flowing backward from the four-way valve 3a toward the compressor 1a.

The four-way valve 3a switches the flow path of the refrigerant between the cooling operation and the heating operation. The flow path of the four-way valve 3a is switched based on a driving signal from a controller 50a described below. During the cooling operation, the controller 50a switches the flow path of the four-way valve 3a such that the high-temperature and high-pressure refrigerant discharged from the compressor 1a flows toward the outdoor heat exchanger 4a and the low-temperature and low-pressure gas refrigerant flowing from the indoor unit 200 through the gas operation valve 9a flows toward the accumulator 10a. In contrast, during the heating operation, the controller 50a switches the flow path of the four-way valve 3a such that the high-temperature and high-pressure refrigerant discharged from the compressor 1a flows toward the indoor heat exchanger 14 through the gas operation valve 9a and the low-temperature and low-pressure gas refrigerant flowing out from the outdoor heat exchanger 4a flows toward the accumulator 10a.

The outdoor heat exchanger 4a causes heat exchange to be performed between the refrigerant flowing into the outdoor heat exchanger 4a and outdoor air supplied from the outdoor air-sending device 12a. The outdoor air-sending device 12a is installed near the outdoor heat exchanger 4a, and promotes heat exchange by the outdoor heat exchanger 4a. During the cooling operation, the outdoor heat exchanger 4a functions as a radiator, and radiates heat of the high-temperature and high-pressure refrigerant flowing from the compressor 1a, to the outdoor air. In contrast, during the heating operation, the outdoor heat exchanger 4a functions as an evaporator, and causes two-phase gas-liquid refrigerant flowing from the subcooling heat exchanger 5a to receive heat from the outdoor air and evaporates the two-phase gas-liquid refrigerant.

The subcooling heat exchanger 5a is used during the cooling operation to subcool the refrigerant. The subcooling heat exchanger 5a includes a high-pressure side flow path through which the high-pressure refrigerant radiating heat in the outdoor heat exchanger 4a flows, and a low-pressure side flow path through which the low-pressure refrigerant adjusted in flow rate and pressure by the expansion valve 6a flows. In other words, the subcooling heat exchanger 5a radiates heat from the refrigerant flowing through the high-pressure side flow path to the refrigerant flowing through the low-pressure side flow path. An opening degree of the expansion valve 6a is adjusted based on a driving signal from the controller 50a.

The expansion valve 7a adjusts the flow rate of the refrigerant passing through the expansion valve 7a, to expand and decompress the refrigerant. In addition, to prevent the compressor 1a from being damaged by liquid backflow during the heating operation, an opening degree of the expansion valve 7a is adjusted based on a driving signal from the controller 50a. The accumulator 10a accumulates excess refrigerant of the refrigerant flowing from the four-way valve 3a.

As described above, the bypass pipe causes the refrigerant branched from the high-pressure side refrigerant pipe between the subcooling heat exchanger 5a and the expansion valve 7a, to flow the low-pressure side refrigerant pipe connecting the four-way valve 3a and the accumulator 10a during the cooling operation. In the bypass process of the refrigerant by the bypass pipe, the refrigerant branched from the refrigerant pipe between the subcooling heat exchanger 5a and the expansion valve 7a is decompressed by the expansion valve 6a, and receives heat from the refrigerant flowing through the high-pressure side flow path in the subcooling heat exchanger 5a.

A detailed configuration of the outdoor unit 100b is similar to the above-described configuration of the outdoor unit 100a. Therefore, descriptions of the components of the outdoor unit 100b are omitted.

Subsequently, a detailed configuration of the indoor unit 200 is described.

The indoor heat exchanger 14 causes heat exchange to be performed between the refrigerant flowing into the indoor heat exchanger 14 and air in an air-conditioned space supplied from the indoor air-sending device 15. The indoor air-sending device 15 is installed near the indoor heat exchanger 14, and promotes heat exchange by the indoor heat exchanger 14. During the cooling operation, the indoor heat exchanger 14 functions as an evaporator, and causes the two-phase gas-liquid refrigerant decompressed by the expansion valve 13 to receive heat from the air in the air-conditioned space and evaporates the two-phase gas-liquid refrigerant. In contrast, during the heating operation, the indoor heat exchanger 14 functions as a radiator, and radiates heat of the high-temperature and high-pressure refrigerant flowing from the compressor 1a of the outdoor unit 100a and the compressor 1b of the outdoor unit 100b to the air in the air-conditioned space and condenses the high-temperature and high-pressure refrigerant. The expansion valve 13 adjusts the flow rate of the refrigerant circulating in the indoor unit 200, and expands and decompresses the refrigerant. The indoor air-sending device 15 includes a fan 15a and a motor 15b driving the fan 15a. A rotation speed of the motor 15b is variable by the inverter control.

When the liquid operation valve 8a and the gas operation valve 9a are opened, the refrigerant can flow in/out between the outdoor unit 100a and the indoor unit 200. Likewise, when the liquid operation valve 8b and the gas operation valve 9b are opened, the refrigerant can flow in/out between the outdoor unit 100b and the indoor unit 200.

During the cooling operation, the liquid distributor 17 merges the refrigerant having passed through the expansion valve 7a of the outdoor unit 100a and the refrigerant having passed through the expansion valve 7b of the outdoor unit 100b, and causes the merged refrigerant to flow into the indoor unit 200. During the heating operation, the liquid distributor 17 branches the refrigerant decompressed by the expansion valve 13 of the indoor unit 200, and causes the branched refrigerant to flow into the outdoor unit 100a and the outdoor unit 100b.

During the cooling operation, the gas distributor 18 branches the low-temperature and low-pressure gas refrigerant flowing out from the indoor heat exchanger 14 of the indoor unit 200, and causes the branched refrigerant to flow into the outdoor unit 100a and the outdoor unit 100b. During the heat operation, the gas distributor 18 merges the refrigerant of the outdoor unit 100a and the refrigerant of the outdoor unit 100b, and causes the merged refrigerant to flow into the indoor unit 200.

The refrigeration cycle device 300 includes a controller 50 controlling the components of the refrigeration cycle device 300. The controller 50 includes dedicated hardware or a central processing unit (CPU) executing a program stored in a memory. The CPU is also referred to as a central processing device, a processing device, a calculation device, a microprocessor, a microcomputer, or a processor.

In a case where the controller 50 is dedicated hardware, the controller 50 corresponds to, for example, a single circuit, a composite circuit, an application specific integrated circuit (ASIC), a field-programmable gate array (FPGA), or a combination thereof. Each of functional units realized by the controller 50 may be realized by individual hardware, or the functional units may be realized by one hardware.

In a case where the controller 50 is a CPU, functions executed by the controller 50 are realized by software, firmware, or a combination of software and firmware. The software and the firmware are described as programs and stored in the memory. The CPU reads out the programs stored in the memory and executes the programs, thereby realizing the functions of the controller 50. The memory is, for example, a nonvolatile or volatile semiconductor memory such as a RAM, a ROM, a flash memory, an EPROM, and an EEPROM.

A part of the functions of the controller 50 may be realized by dedicated hardware, and the other part may be realized by software or firmware.

In the refrigeration cycle device 300 according to Embodiment 1, the controller 50 includes the controller 50a provided in the outdoor unit 100a, a controller 50b provided in the outdoor unit 100b, and a controller 50c provided in the indoor unit 200. The controller 50a, the controller 50b, and the controller 50c can communicate with one another. At least two of the controller 50a, the controller 50b, and the controller 50c may be integrated.

The controller 50a controls the components of the outdoor unit 100a. The controller 50a performs, for example, frequency control of the compressor 1a, switching of the flow path of the four-way valve 3a, adjustment of the opening degree of the expansion valve 6a, and adjustment of the opening degree of the expansion valve 7a. As described above, in Embodiment 1, the frequency of the compressor 1a can be changed by the inverter control. Therefore, the controller 50a includes an inverter 51a that converts a direct current into an alternating current and outputs the alternating current to the compressor 1a. Further, the controller 50a controls the frequency of the compressor 1a by controlling a frequency of the alternating current output from the inverter 51a to the compressor 1a. In other words, the controller 50a controls the frequency of the alternating current output from the inverter 51a to the compressor 1a, thereby controlling a capacity of the compressor 1a.

The controller 50b controls the components of the outdoor unit 100b. The controller 50b performs, for example, frequency control of the compressor 1b, switching of the flow path of the four-way valve 3b, adjustment of the opening degree of the expansion valve 6b, and adjustment of the opening degree of the expansion valve 7b. As described above, in Embodiment 1, the frequency of the compressor 1b can be changed by inverter control. Therefore, the controller 50b includes an inverter 51b that converts a direct current into an alternating current and outputs the alternating current to the compressor 1b. Further, the controller 50b controls the frequency of the compressor 1b by controlling a frequency of the alternating current output from the inverter 51b to the compressor 1b. In other words, the controller 50b controls the frequency of the alternating current output from the inverter 51b to the compressor 1b, thereby controlling a capacity of the compressor 1b. In Embodiment 1, the controller 50a manages a sum of the frequency of the compressor 1a and the frequency of the compressor 1b. Therefore, the controller 50b controls the frequency of the compressor 1b to a frequency of the compressor 1b instructed by the controller 50a.

The controller 50c controls the components of the indoor unit 200. The controller 50c performs, for example, control of the rotation speed of the motor 15b of the indoor air-sending device 15, and adjustment of the opening degree of the expansion valve 13. As described above, in Embodiment 1, the frequency of the motor 15b of the indoor air-sending device 15 can be changed by the inverter control. Therefore, the controller 50c includes an inverter 51c that converts a direct current into an alternating current and outputs the alternating current to the motor 15b. Further, the controller 50c controls the rotation speed of the motor 15b by controlling a frequency of the alternating current output from the inverter 51c to the motor 15b. In other words, the controller 50c controls the frequency of the alternating current output from the inverter 51c to the motor 15b, and controls the rotation speed of the fan 15a of the indoor air-sending device 15, thereby controlling an air volume of the indoor air-sending device 15.

Further, the controller 50 controls the frequency of each of the compressor 1a and the compressor 1b to a frequency at which a temperature of the inverter 51c becomes lower than a first prescribed temperature T1 in a state where the rotation speed of the motor 15b of the indoor air-sending device 15 is lower than a prescribed rotation speed. To realize the configuration, the refrigeration cycle device 300 according to Embodiment 1 includes a temperature sensor 70 detecting the temperature of the inverter 51c. The controller 50c further includes, as the functional units, a determination unit 53, a control unit 54, and a storage unit 55. The first prescribed temperature T1 is lower by a predetermined temperature than a temperature of the inverter 51c at which the indoor air-sending device 15 is abnormally stopped. The determination unit 53, the control unit 54, and the storage unit 55 may be provided in the controller 50a or the controller 50b.

More specifically, as described below with reference to FIG. 2, the inverter 51c includes a heat sink 52 to promote heat radiation from the inverter 51c. The temperature sensor 70 is attached to the heat sink 52. The temperature sensor 70 may be attached to a position other than the heat sink 52 of the inverter 51c, and detect the temperature of the inverter 51c.

The determination unit 53 is a functional unit determining whether to lower the frequency of each of the compressor 1a and the compressor 1b and determining whether to increase the frequency of each of the compressor 1a and the compressor 1b, based on the temperature detected by the temperature sensor 70. The control unit 54 is a functional unit controlling the frequency of each of the compressor 1a and the compressor 1b based on determination of the determination unit 53. In Embodiment 1, the frequency of the compressor 1a is controlled by the controller 50a, and the frequency of the compressor 1b is controlled by the controller 50b. Further, the sum of the frequency of the compressor 1a and the frequency of the compressor 1b is managed by the controller 50a. Therefore, in Embodiment 1, the control unit 54 indirectly controls the frequency of the compressor 1a and the frequency of the compressor 1b by instructing the controller 50a to increase or decrease the sum of the frequency of the compressor 1a and the frequency of the compressor 1b. In a case where the refrigeration cycle device 300 includes only one compressor, the control unit 54 controls a frequency of the one compressor. The storage unit 55 is a functional unit storing information necessary for determination of the determination unit 53, information necessary for the control unit 54 to control the frequency of each of the compressor 1a and the compressor 1b, and other information.

Figure 2:
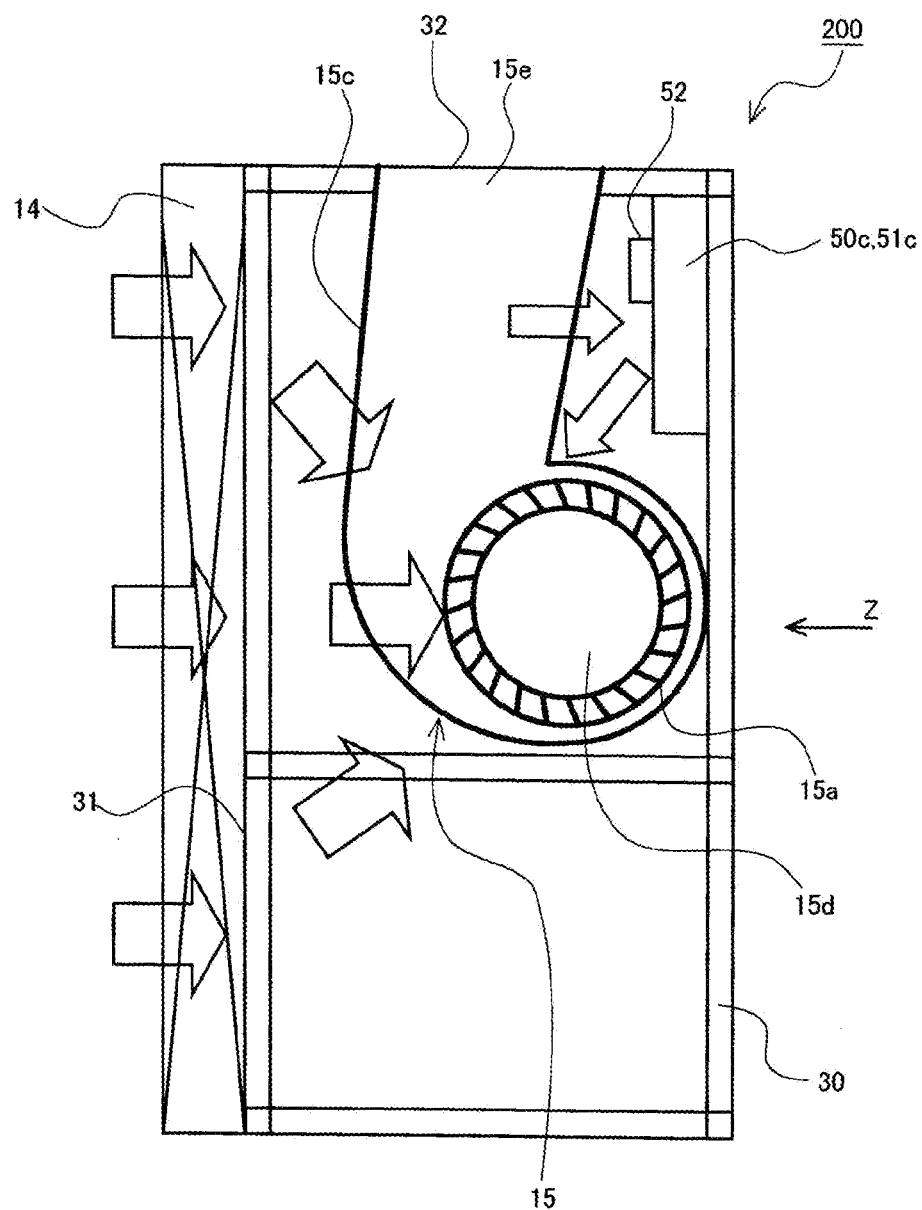
FIG. 2 is a side view illustrating an indoor unit of the refrigeration cycle device according to Embodiment 1 of the present disclosure.
Figure 3:
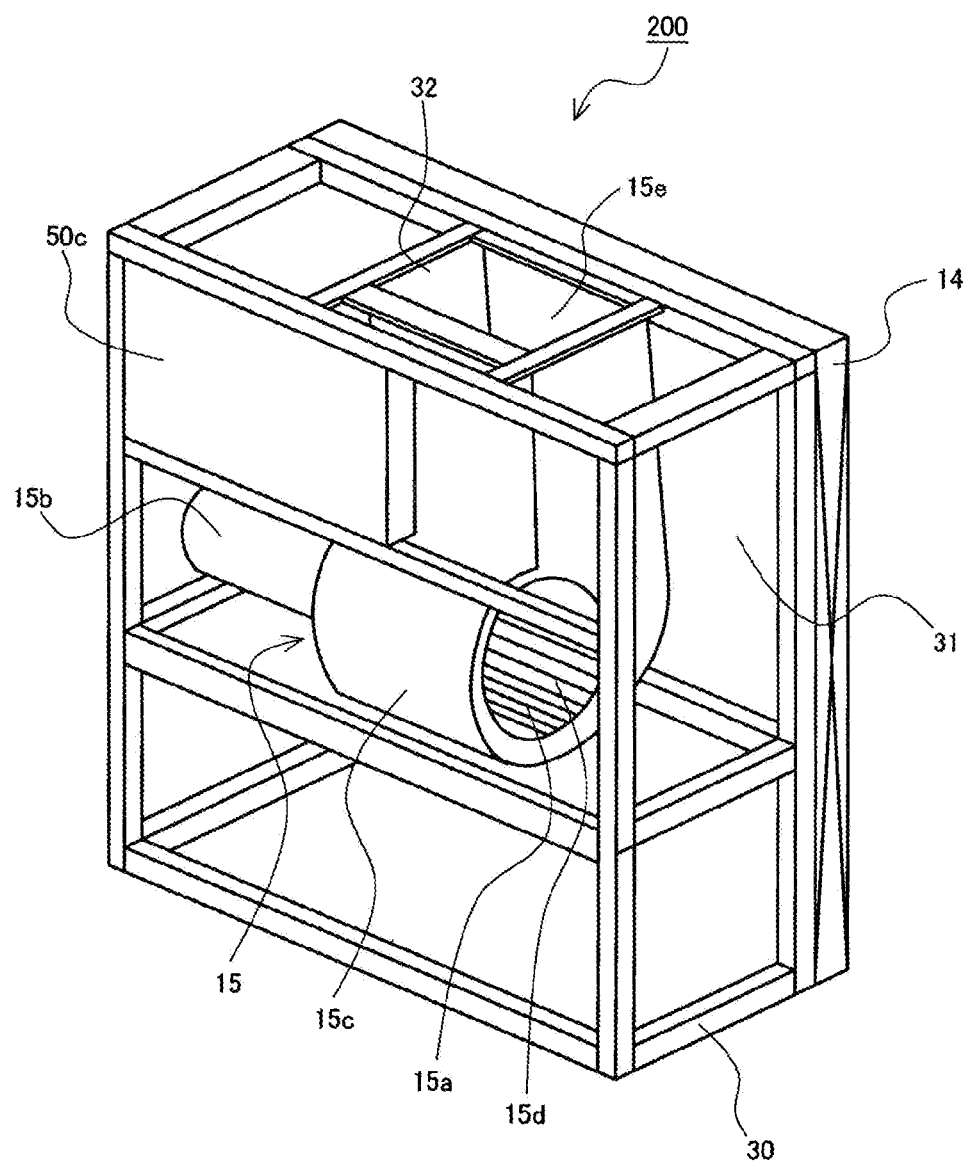
FIG. 3 is a perspective view illustrating the indoor unit of the refrigeration cycle device according to Embodiment 1 of the present disclosure.

FIG. 2 is a side view illustrating the indoor unit of the refrigeration cycle device according to Embodiment 1 of the present disclosure. FIG. 3 is a perspective view illustrating the indoor unit of the refrigeration cycle device according to Embodiment 1 of the present disclosure. In FIG. 2 and FIG. 3, to enable visual recognition of an internal structure of the indoor unit 200, the indoor unit 200 in a state where a cover configuring a side of a housing 30 is detached is illustrated. Further, FIG. 3 is a perspective view of the indoor unit 200 as viewed from a Z direction in FIG. 2. White arrows illustrated in FIG. 2 indicate a flowing direction of the air.

The indoor unit 200 includes the housing 30 having, for example, a substantially cuboid shape. The housing 30 includes an air inlet 31, for example, on its side. The indoor heat exchanger 14 is provided in the air inlet 31. The housing 30 further includes an air outlet 32, for example, on its top.

The indoor air-sending device 15 is housed in the housing 30. In Embodiment 1, a centrifugal fan such as a sirocco fan is used as the fan 15a of the indoor air-sending device 15. The fan 15a is housed in a fan casing 15c. The fan casing 15c includes an air inlet 15d, for example, on its side. The fan casing 15c further includes an air outlet 15e. The air outlet 15e communicates with the air outlet 32 of the housing 30. In other words, as illustrated by the white arrows in FIG. 2, when the fan 15a is rotationally driven by the motor 15b, the air heat-exchanged in the indoor heat exchanger 14 flows into the housing 30. The air flows from the air inlet 15d into the fan casing 15c, and is discharged to outside of the housing 30 through the air outlet 15e of the fan casing 15c and the air outlet 32 of the housing 30.

In addition, at least the inverter 51c of the controller 50c is housed in the housing 30. Therefore, when the fan 15a of the indoor air-sending device 15 is rotationally driven, a part of the air heat-exchanged in the indoor heat exchanger 14, flowing into the housing 30 is blown to the inverter 51c before flowing into the fan casing 15c from the air inlet 15d. In other words, the inverter 51c is disposed at a position exposed to the air heat-exchanged in the indoor heat exchanger 14. More specifically, in Embodiment 1, the heat sink 52 of the inverter 51c is disposed at the position exposed to the air heat-exchanged in the indoor heat exchanger 14. Accordingly, when the inverter 51c generates heat, the inverter 51c is cooled by the air heat-exchanged in the indoor heat exchanger 14.

Figure 4:
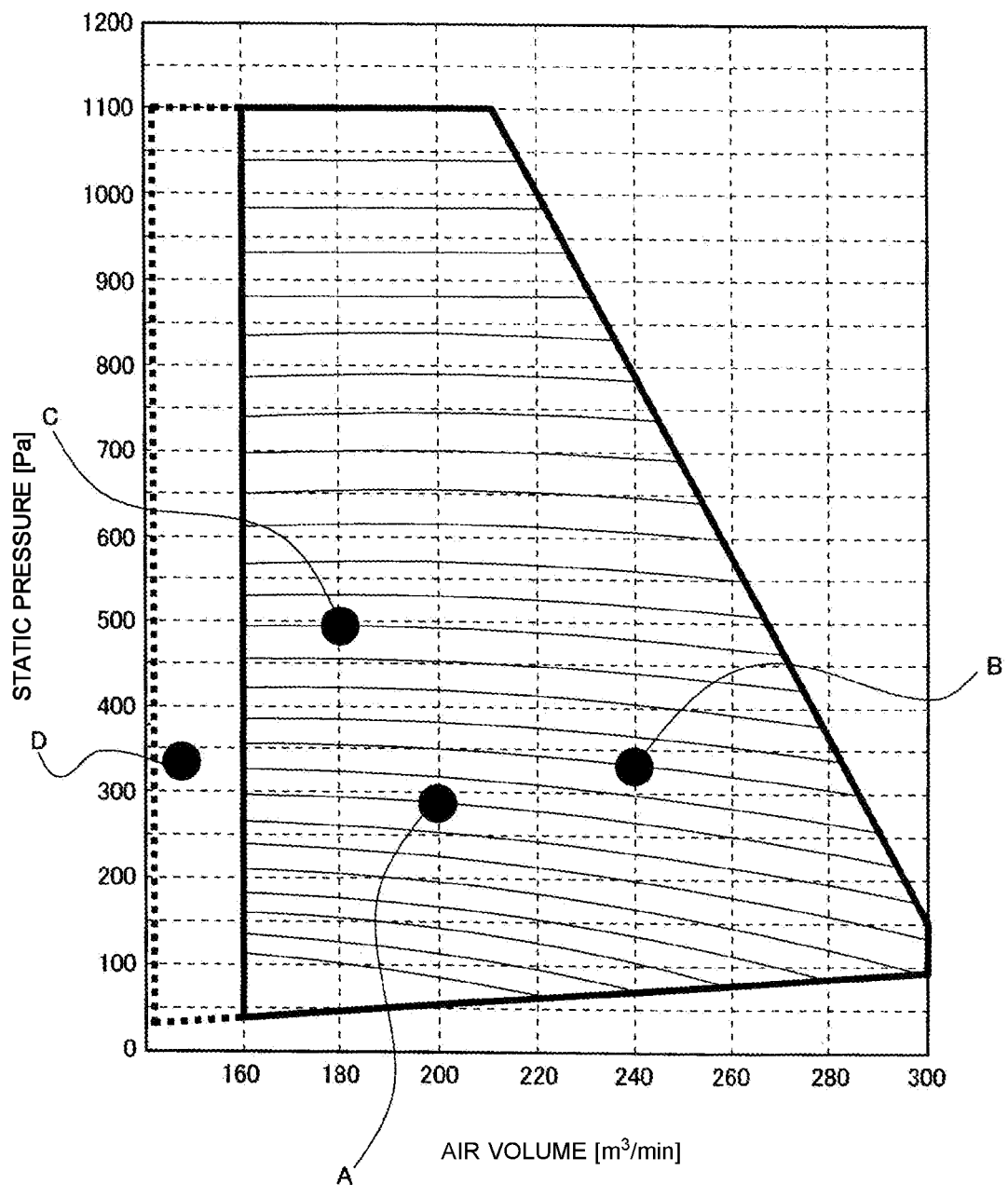
FIG. 4 is a diagram illustrating air volume-static pressure characteristics of an indoor air-sending device of the refrigeration cycle device according to Embodiment 1 of the present disclosure.

FIG. 4 is a diagram illustrating air volume-static pressure characteristics of the indoor air-sending device of the refrigeration cycle device according to Embodiment 1 of the present disclosure. A lateral axis of FIG. 4 indicates the air volume of the indoor air-sending device 15. A vertical axis in FIG. 4 indicates static pressure inside an air duct to which the air is blown out from the fan 15a. In Embodiment 1, a range between the fan 15a and the air outlet 15e of the fan casing 15c corresponds to the air duct to which the air is blown out from the fan 15a. A region surrounded by a thick solid line illustrated in FIG. 4 indicates a region where the indoor air-sending device 15 can perform continuous operation without being abnormally stopped even when the refrigeration cycle device 300 is controlled by a method similar to a known method. A region surrounded by a thick dashed line in FIG. 4 indicates a region where the rotation speed of the motor 15b is lower than the prescribed rotation speed, and the indoor air-sending device 15 may be abnormally stopped when the refrigeration cycle device 300 is controlled by a method similar to the known method.

In the refrigeration cycle device 300 according to Embodiment 1, the rotation speed of the motor 15b of the indoor air-sending device 15 can be changed. Accordingly, when the rotation speed of the motor 15b is changed to change the rotation speed of the fan 15a, the air volume of the indoor air-sending device 15 can be changed in the operation. At this time, when the refrigeration cycle device 300 is controlled by a method similar to the known method and the indoor air-sending device 15 is operated to realize a state at each of point A, point B, and point C illustrated in FIG. 4, the temperature of the inverter 51c does not exceed an allowable temperature, and the indoor air-sending device 15 can perform continuous operation.

On the other hand, when the refrigeration cycle device 300 is controlled by a method similar to the known method and the indoor air-sending device 15 is operated with the small air volume as in point D illustrated in FIG. 4, a load of the indoor air-sending device 15 is small because of the small air volume; however, the temperature of the inverter 51c may exceed the allowable temperature and the indoor air-sending device 15 may be abnormally stopped. The reason is as follows. As described above, the inverter 51c is cooled by the air heat-exchanged in the indoor heat exchanger 14. At this time, when the air volume is small as in the point D illustrated in FIG. 4, capacity to cool the inverter 51c is insufficient. Therefore, when the refrigeration cycle device 300 is controlled by a method similar to the known method, it is necessary to limit the air volume range of the indoor air-sending device 15 to the region surrounded by the thick solid line.

However, it is supposed that, to meet customer demands for the refrigeration cycle device in future, the air volume range required for the indoor air-sending device 15 is increased, and necessity to operate the indoor air-sending device 15 within the low air volume region surrounded by the thick dashed line arises. For example, it is supposed that, in a case where a damper device changing an opening port area of the air outlet 32 is provided in the indoor unit 200, necessity to operate the indoor air-sending device 15 within the low air volume region surrounded by the thick dashed line arises.

Therefore, in the refrigeration cycle device 300 according to Embodiment 1, the heating operation is performed by the following operation to control the frequency of each of the compressor 1a and the compressor 1b to a frequency at which the temperature of the inverter 51c becomes lower than the first prescribed temperature T1 in the state where the rotation speed of the motor 15b of the indoor air-sending device 15 is lower than the prescribed rotation speed. As a result, even when the indoor air-sending device 15 is operated within the low air volume region surrounded by the thick dashed line, it is possible to prevent the temperature of the inverter 51c from exceeding the allowable temperature, namely, it is possible to prevent the indoor air-sending device 15 from being abnormally stopped, and to continuously operate the indoor air-sending device 15.

Figure 5:
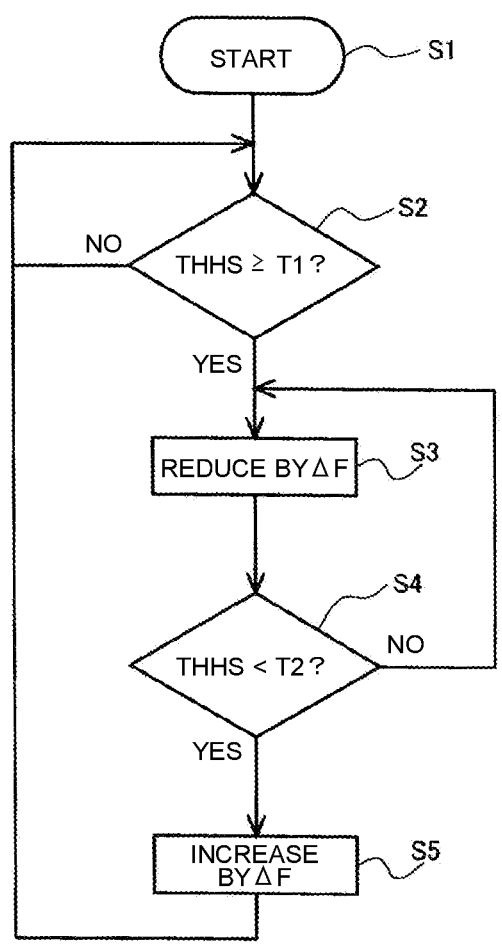
FIG. 5 is a flowchart illustrating operation of the refrigeration cycle device during heating operation according to Embodiment 1 of the present disclosure.

FIG. 5 is a flowchart illustrating the operation of the refrigeration cycle device during the heating operation according to Embodiment 1 of the present disclosure.

When an instruction to start the heating operation is input to the refrigeration cycle device 300, the controller 50 controls the components of the refrigeration cycle device 300 by a known control method during the heating operation in step S1. Thereafter, the controller 50 repeats control in and after step S2 until an instruction to end the heating operation is input to the refrigeration cycle device 300.

More specifically, in step S2, the determination unit 53 of the controller 50 compares a detected temperature THHS of the temperature sensor 70 with the first prescribed temperature T1. In other words, the determination unit 53 compares the temperature of the inverter 51c with the first prescribed temperature T1. The first prescribed temperature T1 is stored in the storage unit 55 of the controller 50.

In a case where the detected temperature THHS of the temperature sensor 70 is lower than the first prescribed temperature T1, the determination unit 53 repeats the processing in step S2. In a case where the detected temperature THHS of the temperature sensor 70 is greater than or equal to the first prescribed temperature T1, the control unit 54 of the controller 50 lowers the sum of the frequency of the compressor 1a and the frequency of the compressor 1b by ΔF in step S3. When the sum of the frequency of the compressor 1a and the frequency of the compressor 1b is lowered by ΔF, a condensing temperature that is the temperature of the refrigerant flowing through the indoor heat exchanger 14 is lowered. As a result, the temperature of the air flowing into the housing 30 of the indoor unit 200 after the heat exchange in the indoor heat exchanger 14 is lowered. In other words, the temperature of the air cooling the inverter 51c is lowered. This makes it possible to sufficiently cool the inverter 51c. Accordingly, even when the indoor air-sending device 15 is operated within the low air volume region surrounded by the thick dashed line illustrated in FIG. 4, it is possible to prevent the temperature of the inverter 51c from exceeding the allowable temperature, namely, it is possible to prevent the indoor air-sending device 15 from being abnormally stopped, and to continuously operate the indoor air-sending device 15.

In Embodiment 1, to suppress degradation of heating capacity of the refrigeration cycle device 300 as much as possible, processing in step S4 and step S5 is performed after the processing in step S3.

More specifically, in step S4, the determination unit 53 of the controller 50 compares the detected temperature THHS of the temperature sensor 70 with a second prescribed temperature T2. In other words, the determination unit 53 compares the temperature of the inverter 51c with the second prescribed temperature T2. The second prescribed temperature T2 is lower than the first prescribed temperature T1, and is stored in the storage unit 55 of the controller 50.

In a case where the detected temperature THHS of the temperature sensor 70 is lower than the second prescribed temperature T2, the control unit 54 increases the sum of the frequency of the compressor 1a and the frequency of the compressor 1b by ΔF in step S5. Thereafter, the processing by the controller 50 returns to step S2. When the sum of the frequency of the compressor 1a and the frequency of the compressor 1b is increased by ΔF, it is possible to suppress degradation of the heating capacity of the refrigeration cycle device 300. When the sum of the frequency of the compressor 1a and the frequency of the compressor 1b is frequently increased/reduced, the heating operation of the refrigeration cycle device 300 is not stable. Therefore, a difference between the first prescribed temperature T1 and the second prescribed temperature T2 is preferably large. In Embodiment 1, the difference between the first prescribed temperature T1 and the second prescribed temperature T2 is set to 15 degrees C. or more.

In contrast, in a case where the detected temperature THHS of the temperature sensor 70 is greater than or equal to the second prescribed temperature T2, the processing of the control unit 54 returns to step S3, and the control unit 54 reduces the sum of the frequency of the compressor 1a and the frequency of the compressor 1b by ΔF. In other words, in the case where the detected temperature THHS of the temperature sensor 70 is greater than or equal to the first prescribed temperature T1, the control unit 54 according to Embodiment 1 reduces the sum of the frequency of the compressor 1a and the frequency of the compressor 1b in a step-wise manner until the detected temperature THHS of the temperature sensor 70 becomes lower than the second prescribed temperature T2.

At this time, the sum of the frequency of the compressor 1a and the frequency of the compressor 1b may be reduced only once to make the detected temperature THHS of the temperature sensor 70 lower than the second prescribed temperature T2. However, when the sum of the frequency of the compressor 1a and the frequency of the compressor 1b is reduced in a step-wise manner, the value ΔF that is a reduction amount for one time can be reduced, which makes it possible to prevent the sum of the frequency of the compressor 1a and the frequency of the compressor 1b from being excessively lowered. Accordingly, reducing the sum of the frequency of the compressor 1a and the frequency of the compressor 1b in a step-wise manner makes it possible to suppress degradation of the heating capacity of the refrigeration cycle device 300.

When the sum of the frequency of the compressor 1a and the frequency of the compressor 1b is reduced in a step-wise manner and the sum of the frequency of the compressor 1a and the frequency of the compressor 1b becomes the allowable minimum value, the controller 50 stops the heating operation of the refrigeration cycle device 300.

As described above, the refrigeration cycle device 300 according to Embodiment 1 includes the refrigeration cycle circuit, the indoor air-sending device 15, and the controller 50. The refrigeration cycle circuit includes the compressor variable in frequency, and the indoor heat exchanger 14 functioning as the radiator. The indoor air-sending device 15 includes the fan 15a and the motor 15b that drives the fan 15a and is variable in rotation speed. The indoor air-sending device 15 supplies the air to the indoor heat exchanger 14 by the fan 15a rotated by the motor 15b. The controller 50 controls the frequency of the compressor 1a and the rotation speed of the motor 15b. Further, the controller 50 includes the inverter 51c that converts the direct current into the alternating current and outputs the alternating current to the motor 15b, and controls the rotation speed of the motor 15b by controlling the frequency of the alternating current output from the inverter 51c to the motor 15b. The inverter 51c is disposed at a position exposed to the air heat-exchanged in the indoor heat exchanger 14. The controller 50 controls the frequency of the compressor to the frequency at which the temperature of the inverter 51c becomes lower than the first prescribed temperature T1 in the state where the rotation speed of the motor 15b is lower than the prescribed rotation speed.

As described above, the refrigeration cycle device 300 according to Embodiment 1 controls the condensing temperature that is the temperature of the refrigerant flowing through the indoor heat exchanger 14, namely, controls the temperature of the air cooling the inverter 51c. Even in the case where the rotation speed of the motor 15b of the indoor air-sending device 15 becomes lower than the prescribed rotation speed, the refrigeration cycle device 300 maintains the temperature of the inverter 51c at the temperature lower than the first prescribed temperature T1. Therefore, the refrigeration cycle device 300 according to Embodiment 1 can make the air volume range of the indoor air-sending device 15 larger than the known air volume range. In other words, even in the operation state where the indoor air-sending device 15 is abnormally stopped with the known technology, the refrigeration cycle device 300 according to Embodiment 1 can perform continuous operation.

Embodiment 2

In Embodiment 1, when the temperature of the inverter 51c becomes greater than or equal to the first prescribed temperature T1, the condensing temperature of the refrigerant is lowered to enable the continuous operation of the indoor air-sending device 15 within the low air volume region. Therefore, in Embodiment 1, the heating capacity of the refrigeration cycle device 300 is lowered until the temperature of the inverter 51c becomes lower than the second prescribed temperature T2. In contrast, when the refrigeration cycle device 300 is configured as described in Embodiment 2, it is possible to continuously operate the indoor air-sending device 15 within the low air volume region, and to improve the heating capacity of the refrigeration cycle device 300 as compared with Embodiment 1. Note that, in Embodiment 2, items not particularly described are similar to the items in Embodiment 1, and the same functions and the same components are described by using the same reference numerals.

Figure 6:
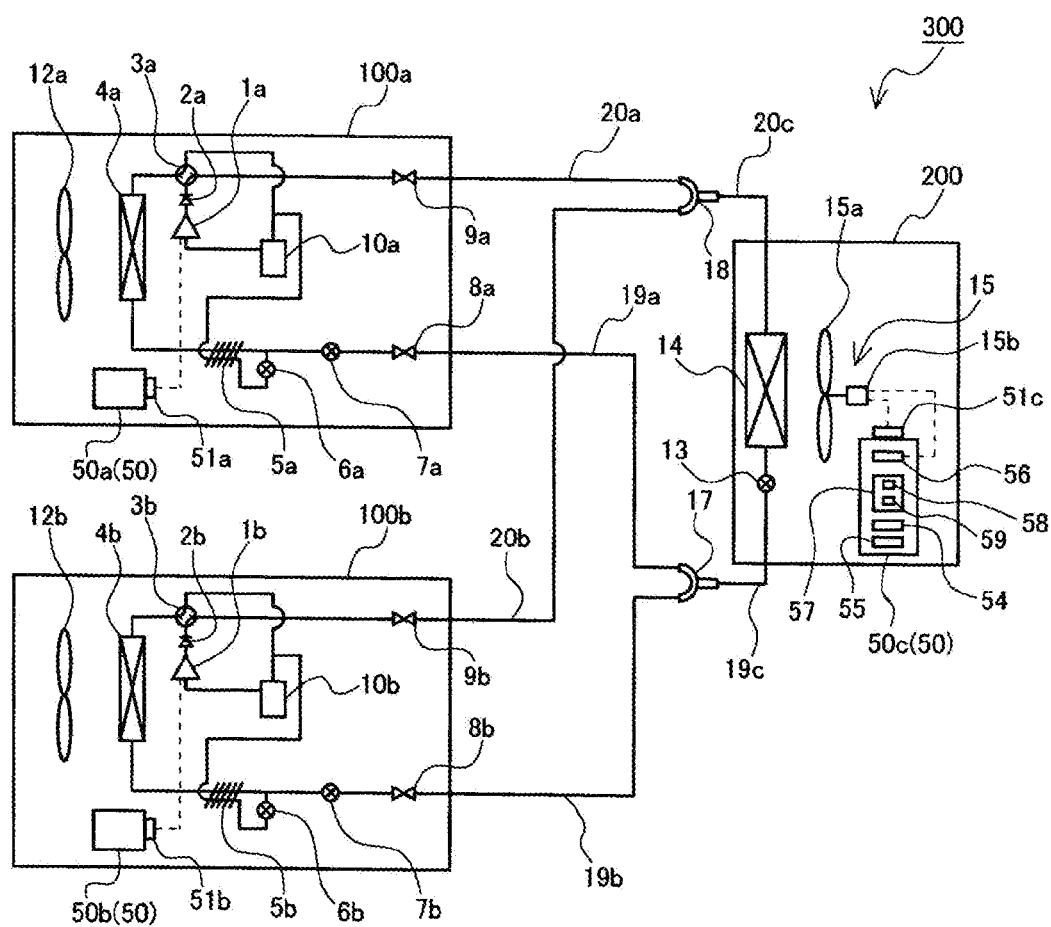
FIG. 6 is a diagram illustrating an entire configuration of a refrigeration cycle device according to Embodiment 2 of the present disclosure.
Figure 7:
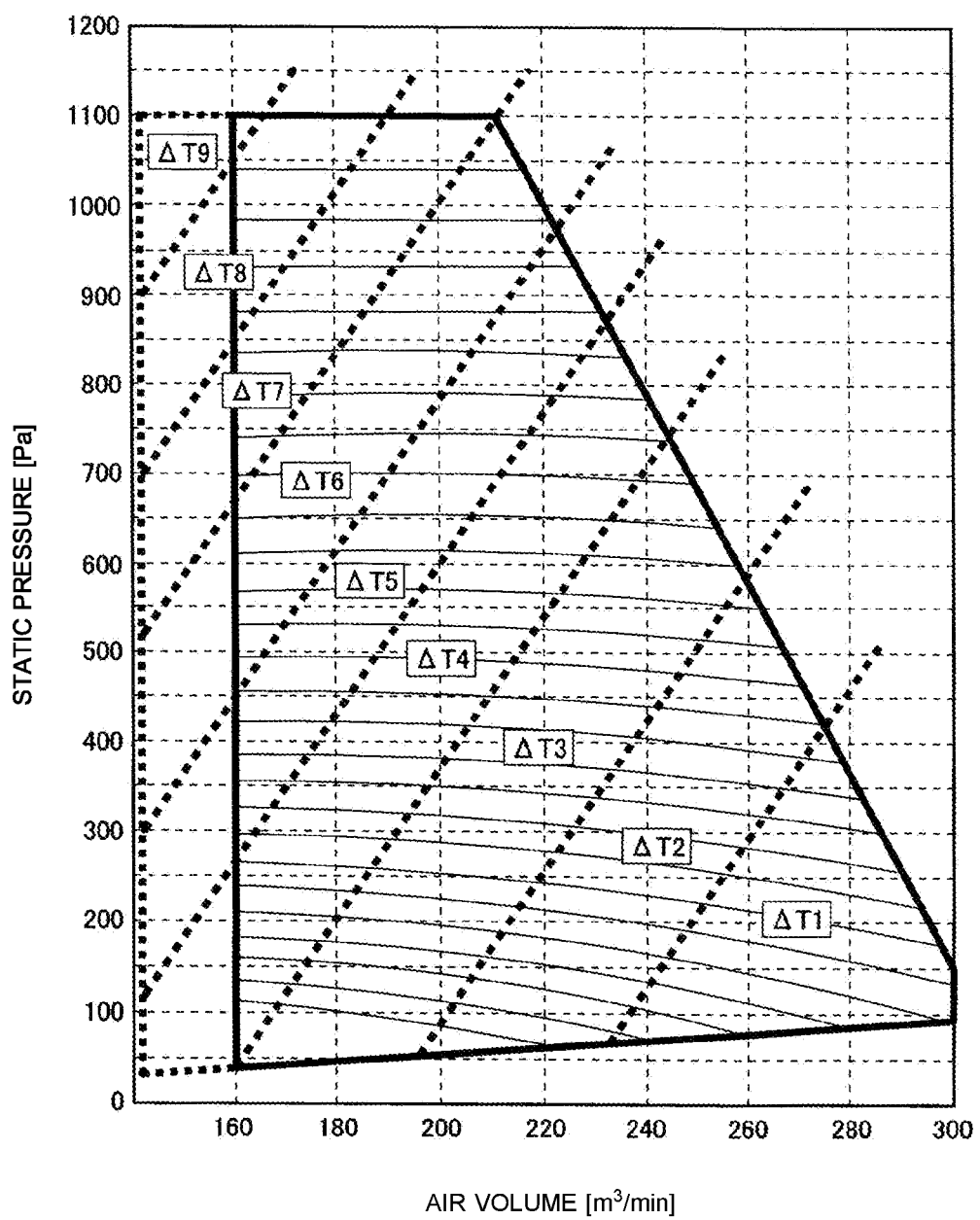
FIG. 7 is a diagram illustrating air volume-static pressure characteristics of an indoor air-sending device of the refrigeration cycle device according to Embodiment 2 of the present disclosure.

FIG. 6 is a diagram illustrating an entire configuration of a refrigeration cycle device according to Embodiment 2 of the present disclosure. FIG. 7 is a diagram illustrating air volume-static pressure characteristics of an indoor air-sending device of the refrigeration cycle device according to Embodiment 2 of the present disclosure.

The controller 50c of the refrigeration cycle device 300 according to Embodiment 2 includes, as functional units, a state acquisition unit 56, a first calculation unit 57, the control unit 54, and the storage unit 55. Further, the first calculation unit 57 includes a second calculation unit 58 and a third calculation unit 59.

The state acquisition unit 56 is a functional unit acquiring a driving state of the indoor air-sending device 15. More specifically, the state acquisition unit 56 acquires, as the driving state of the indoor air-sending device 15, the air volume of the indoor air-sending device 15 and static pressure inside the air duct to which the air is blown out from the fan 15*a*. Although the state acquisition unit 56 may acquire the air volume and the static pressure by directly detecting the air volume and the static pressure, in Embodiment 2, the state acquisition unit 56 acquires the air volume and the static pressure in the following manner.

The storage unit 55 stores information representing relationship between the air volume of the indoor air-sending device 15 and the static pressure inside the air duct to which the air is blown out from the fan 15*a* as illustrated in FIG. 7. The storage unit 55 stores, for example, a relational expression or a table representing the relationship between the air volume and the static pressure, as the information representing the relationship between the air volume and the static pressure. When the relationship between the air volume and the static pressure is known, the air volume of the indoor air-sending device 15 and the static pressure inside the air duct to which the air is blown out from the fan 15*a* can be calculated with use of the current value of the current input to the indoor air-sending device 15 and the rotation speed of the fan 15*a*. Therefore, the state acquisition unit 56 detects the current value of the current input to the indoor air-sending device 15 and the rotation speed of the fan 15*a*, and calculates the air volume of the indoor air-sending device 15 and the static pressure inside the air duct to which the air is blown out from the fan 15*a*, thereby acquiring the air volume and the static pressure. At this time, as a method of detecting the current value of the current input to the indoor air-sending device 15 and a method of detecting the rotation speed of the fan 15*a*, any of various well-known methods can be adopted. In Embodiment 2, the current value of the current input to the indoor air-sending device 15 and the rotation speed of the fan 15*a* are detected, for example, every 30 seconds. In other words, in Embodiment 2, the air volume of the indoor air-sending device 15 and the static pressure inside the air duct to which the air is blown out from the fan 15*a* are acquired, for example, every 30 seconds. Alternatively, the current value of the current input to the indoor air-sending device 15 and the rotation speed of the fan 15*a* may be used as the driving state of the indoor air-sending device 15 without being converted into the above-described air volume and static pressure.

The first calculation unit 57 is a functional unit that calculates the condensing temperature of the refrigerant at which the temperature of the inverter 51*c* becomes lower than the first prescribed temperature, by using the driving state of the indoor air-sending device 15 acquired by the state acquisition unit 56. In Embodiment 2, the first calculation unit 57 calculates the condensing temperature of the refrigerant at which the temperature of the inverter 51*c* becomes lower than the first prescribed temperature in the following manner.

First, in the first calculation unit 57, the second calculation unit 58 calculates a temperature rise degree $\Delta T$ representing a temperature rise of the inverter 51*c* from a temperature of the air blown to the inverter 51*c*, by using the driving state of the indoor air-sending device 15 acquired by the state acquisition unit 56. In other words, in the first calculation unit 57, the second calculation unit 58 calculates the temperature rise degree $\Delta T$ representing the temperature rise of the inverter 51*c* from an ambient air temperature of the inverter 51*c*, by using the driving state of the indoor air-sending device 15 acquired by the state acquisition unit 56. More specifically, when the inverter 51*c* is driven, namely, when the indoor air-sending device 15 is driven, the cooling capacity of the inverter 51*c* is decreased and the temperature of the inverter 51*c* is easily increased as the air volume of the indoor air-sending device is small. In other words, the temperature rise degree $\Delta T$ is increased. Further, when the inverter 51*c* is driven, namely, when the indoor air-sending device 15 is driven, the motor 15*b* is rotated at high speed and the temperature of the inverter 51*c* is easily increased as the static pressure inside the air duct to which the air is blown out from the fan 15*a* is large. In other words, the temperature rise degree $\Delta T$ is increased.

Accordingly, the temperature rise degree $\Delta T$ is changed as illustrated in FIG. 7 depending on the driving state of the indoor air-sending device 15. The temperature rise degree $\Delta T$ illustrated in FIG. 7 is increased from $\Delta T1$ toward $\Delta T9$. The storage unit 55 stores the information representing the relationship between the driving state of the indoor air-sending device 15 and the temperature rise degree $\Delta T$ illustrated in FIG. 7. The storage unit 55 stores, for example, a relational expression or a table representing the relationship between the driving state of the indoor air-sending device 15 and the temperature rise degree $\Delta T$, as the information representing the relationship between the driving state of the indoor air-sending device 15 and the temperature rise degree $\Delta T$. Further, the second calculation unit 58 of the first calculation unit 57 calculates the temperature rise degree $\Delta T$ from the relationship between the driving state of the indoor air-sending device 15 and the temperature rise degree $\Delta T$.

In the first calculation unit 57, after the second calculation unit 58 calculates the temperature rise degree $\Delta T$, the third calculation unit 59 calculates a condensing temperature Tcm of the refrigerant at which the temperature of the inverter 51*c* becomes lower than the first prescribed temperature T1, by using the temperature rise degree $\Delta T$ calculated by the second calculation unit 58. More specifically, first, the third calculation unit 59 calculates a target temperature THHSm of the inverter 51*c*. In Embodiment 2, the target temperature THHSm of the inverter 51*c* is set lower than the first prescribed temperature T1 by a predetermined temperature. For example, the target temperature THHSm of the inverter 51*c* in driving is set to a temperature lower by 5 degrees C. from the first prescribed temperature T1. The target temperature THHSm of the inverter 51*c* may be previously stored in the storage unit 55.

During the heating operation of the refrigeration cycle device 300, the temperature of the air blown to the inverter 51*c*, namely, the temperature of the ambient air of the inverter 51*c* is the condensing temperature of the refrigerant flowing through the indoor heat exchanger 14 at the maximum. Accordingly, the temperature of the inverter 51*c* can be roughly calculated by adding the temperature rise degree $\Delta T$ to the condensing temperature of the refrigerant flowing through the indoor heat exchanger 14. Thus, the condensing temperature Tcm of the refrigerant at which the temperature of the inverter 51*c* becomes lower than the first prescribed temperature T1 can be calculated as a value obtained by subtracting the temperature rise degree $\Delta T$ from the target temperature THHSm of the inverter 51*c*. Therefore, the third calculation unit 59 calculates the condensing temperature Tcm of the refrigerant at which the temperature of the inverter 51*c* becomes lower than the first prescribed temperature T1, by subtracting the temperature rise degree $\Delta T$ from the target temperature THHSm of the inverter 51*c*. As described above, in Embodiment 2, the current value of the current input to the indoor air-sending device 15 and the rotation speed of the fan 15*a* are detected, for example, every 30 seconds. Accordingly, the condensing temperature Tcm of the refrigerant at which the temperature of the inverter 51c becomes lower than the first prescribed temperature T1 is also calculated, for example, every 30 seconds.

In the above description, the information representing the relationship between the driving state of the indoor air-sending device 15 and the temperature rise degree ΔT is stored in the storage unit 55. Alternatively, the information representing the relationship between the driving state of the indoor air-sending device 15 and the condensing temperature Tcm of the refrigerant may be stored in the storage unit 55. As a result, the first calculation unit 57 can directly calculate the condensing temperature Tcm of the refrigerant at which the temperature of the inverter 51c becomes lower than the first prescribed temperature T1, from the driving state of the indoor air-sending device 15.

As described above, in the refrigeration cycle device 300 having the configuration described in Embodiment 2, during the heating operation, the control unit 54 controls the sum of the frequency of the compressor 1a and the frequency of the compressor 1b to make the condensing temperature of the refrigerant flowing through the indoor heat exchanger 14 coincident with the condensing temperature Tcm. As a result, as compared with the refrigeration cycle device 300 described in Embodiment 1, the refrigeration cycle device 300 according to Embodiment 2 can prevent the condensing temperature of the refrigerant flowing through the indoor heat exchanger 14 from being lowered when the indoor air-sending device 15 is continuously operated within the low air volume region during the heating operation. Therefore, as compared with the refrigeration cycle device 300 described in Embodiment 1, the refrigeration cycle device 300 according to Embodiment 2 can improve the heating capacity when the indoor air-sending device 15 is continuously operated within the low air volume region during the heating operation.

The invention claimed is:

1. A refrigeration cycle device, comprising:
    a refrigeration cycle circuit through which refrigerant circulates, the refrigeration cycle circuit including a compressor variable in frequency and an indoor heat exchanger functioning as a radiator;
    an indoor air-sending device including a fan and a motor, the motor driving the fan and being variable in rotation speed, the indoor air-sending device being configured to supply air to the indoor heat exchanger by the fan rotated by the motor; and
    a controller configured to control the frequency of the compressor and the rotation speed of the motor, wherein
    the controller includes an inverter that converts a direct current into an alternating current and outputs the alternating current to the motor,
    the controller controls the rotation speed of the motor by controlling a frequency of the alternating current output from the inverter to the motor,
    the inverter is disposed at a position exposed to air heat-exchanged by the indoor heat exchanger, and
    the controller controls the frequency of the compressor to a frequency at which a temperature of the inverter becomes lower than a first prescribed temperature, which is a condensing temperature at which refrigerant flowing through the indoor heat exchanger condenses, in a state where the rotation speed of the motor is lower than a prescribed rotation speed, which is a speed at which the indoor air-sending device is abnormally stopped.

2. The refrigeration cycle device of claim 1, further comprising a temperature sensor configured to detect the temperature of the inverter, wherein
    the controller reduces the frequency of the compressor in a case where a temperature detected by the temperature sensor becomes greater than or equal to the first prescribed temperature, and
    the controller increases the frequency of the compressor in a case where the temperature detected by the temperature sensor becomes lower than a second prescribed temperature that is lower than the first prescribed temperature.

3. The refrigeration cycle device of claim 2, wherein, in the case where the temperature detected by the temperature sensor becomes greater than or equal to the first prescribed temperature, the controller reduces the frequency of the compressor in a step-wise manner until the temperature detected by the temperature sensor becomes lower than the second prescribed temperature.

4. The refrigeration cycle device of claim 1, wherein the controller includes a state acquisition unit, a first calculation unit, and a control unit, the state acquisition unit acquiring a driving state of the indoor air-sending device, the first calculation unit calculating the condensing temperature of the refrigerant at which the temperature of the inverter becomes lower than the first prescribed temperature, by using the driving state of the indoor air-sending device acquired by the state acquisition unit, the control unit controlling the frequency of the compressor to obtain the condensing temperature calculated by the first calculation unit.

5. The refrigeration cycle device of claim 4, wherein the first calculation unit includes a second calculation unit and a third calculation unit, the second calculation unit calculating a temperature rise degree representing a temperature rise of the inverter from a temperature of air blown to the inverter, by using the driving state of the indoor air-sending device acquired by the state acquisition unit, the third calculation unit calculating the condensing temperature of the refrigerant at which the temperature of the inverter becomes lower than the first prescribed temperature, by using the temperature rise degree calculated by the second calculation unit.

6. The refrigeration cycle device of claim 4, wherein the state acquisition unit acquires, as the driving state of the indoor air-sending device, an air volume of the indoor air-sending device and static pressure inside an air duct to which air is blown out from the fan.

7. The refrigeration cycle device of claim 6, wherein the state acquisition unit acquires the air volume and the static pressure by calculating the air volume and the static pressure with use of a current value of the current input to the motor and the rotation speed of the fan.

* * * * *